United States Patent [19]
Abadi et al.

[11] Patent Number: 5,347,546
[45] Date of Patent: Sep. 13, 1994

[54] METHOD AND APPARATUS FOR PREFILTERING A GLOBAL POSITIONING SYSTEM RECEIVER

[75] Inventors: Kamran K. Abadi, Menlo Park; Steven C. Evans, Soquel, both of Calif.

[73] Assignee: Ashtech, Inc., Sunnyvale, Calif.

[21] Appl. No.: 874,795

[22] Filed: Apr. 28, 1992

[51] Int. Cl.$^5$ .............................................. H04L 25/06
[52] U.S. Cl. ......................................... 375/75; 375/96; 342/357
[58] Field of Search .......................... 375/38, 75, 1, 96; 342/352, 357; 364/449; 333/127, 126, 129

[56] References Cited

U.S. PATENT DOCUMENTS

| | | | |
|---|---|---|---|
| 4,359,733 | 11/1982 | O'Neill | 343/6.5 |
| 4,426,712 | 1/1984 | Gorski-Popiel | 375/96 |
| 4,445,118 | 4/1984 | Taylor et al. | 343/357 |
| 4,457,006 | 6/1984 | Maine | 375/87 |
| 4,468,793 | 8/1984 | Johnson et al. | 375/97 |
| 4,546,534 | 10/1985 | Nishikawa et al. | 333/206 |
| 4,622,557 | 11/1986 | Westerfield | 342/357 |
| 4,902,991 | 2/1990 | Ishikawa et al. | 333/126 |
| 4,916,582 | 4/1990 | Okamura et al. | 361/321 |
| 4,928,106 | 5/1990 | Ashjaee et al. | 342/352 |
| 5,068,629 | 11/1991 | Nishikawa et al. | 333/1.1 |
| 5,134,407 | 7/1992 | Lorenz et al. | 342/352 |

OTHER PUBLICATIONS

Electronic Applications of the Smith Chart In Waveguide, Circuit, and Component Analysis By: Philip H. Smith, p. 17.

*Primary Examiner*—Tesfaldet Bocure

[57] ABSTRACT

A method and apparatus for pre-filtering a global positioning system receiver, which includes the steps of: receiving a plurality of L-band radio frequency signals having unique modulation and originating in a plurality of global positioning system satellites; splitting the plurality of radio frequency signals into at least a first L1 radio frequency signal and a second L2 radio frequency signal; passing the first L1 radio frequency signal to a first radio frequency receiving section through a L1 signal passage defining a path from a common junction point to the L1 radio frequency receiving section, while simultaneously passing the L2 radio frequency signal to a second radio frequency receiving section through a L2 signal passage defining a path from the common junction point to the L2 radio frequency receiving section; filtering the L1 radio frequency signal from the L2 signal passage and filtering the L2 radio frequency signal from the L1 signal passage, while substantially preserving the L1 radio frequency and the L2 radio frequency signals; and feeding the L1 and the L2 radio frequency signals to the first L1 radio frequency receiving section and the second L2 radio frequency receiving section, for determining position information.

20 Claims, 2 Drawing Sheets

METHOD AND APPARATUS FOR PREFILTERING A GLOBAL POSITIONING SYSTEM RECEIVER

BACKGROUND OF THE INVENTION

1. Field of the Invention

This invention relates generally to satellite receivers, and more particularly, to a method and apparatus for prefiltering a global positioning system receiver.

The United States government has placed into orbit a number of satellites as part of a global positioning system (GPS). A GPS receiver receives signals from several such satellites and can determine very accurate parameters, such as position, velocity, and time. There are both military and commercial uses. A primary military use is for a receiver in an aircraft or ship to constantly determine the position and velocity of the plane or ship. An example of a commercial use includes surveying and the accurate determination of the location of a fixed point or a distance between two fixed points, with a high degree of accuracy. Another example is the generation of a high accuracy timing reference.

In order to accomplish this, each satellite continually transmits two L-band signals. A receiver simultaneously detects the signals from several satellites and processes them to extract information from the signals in order to calculate the desired parameters, such as position, velocity or time. The United States government has adopted standards for these satellite transmissions so that others may utilize the satellite signals by building receivers for specific purposes. The satellite transmission standards are discussed in many technical articles and are set forth in detail by an "Interface Control Document" of Rockwell International Corporation, entitled "Navstar GPS Space Segment/Navigation User Interfaces", dated Sep. 26, 1984, as revised Dec. 19, 1986.

Briefly, each satellite transmits an L1 signal on a 1575.42 MHz carrier, usually expressed as $1540f_0$, where $f_0 = 1.023$ MHz. A second L2 signal transmitted by each satellite has a carrier frequency of 1227.6 MHz, or $1200f_0$.

Each of these signals is modulated in the satellite by at least one pseudo-random signal function that is unique to that satellite. This results in developing a spread spectrum signal that resists the effects of radio frequency noise or intentional jamming. It also allows the L-band signals from a number of satellites to be individually identified and separated in a receiver. One such pseudo-random function is a precision code ("P-code") that modulates both of the L1 and L2 carriers in the satellite. The P-code has a 10.23 MHz clock rate and thus causes the L1 and L2 signals to have a 20.46 MHz bandwidth. The P-code is seven days in length. In addition, the L1 signal of each satellite is modulated by a second pseudo-random function, or a unique clear acquisition code ("C/A-code"), having a 1.023 MHz clock rate and repeating its pattern every one millisecond, thus containing 1023 bits. Further, the L1 carrier is also modulated by a 50 bit-per-second navigational data stream that provides certain information of satellite identification, status and the like.

In a receiver, signals corresponding to the known pseudo-random functions are generated and aligned in phase with those modulated onto the satellite signals in the process of demodulating those signals. The phase of the carriers from each satellite being tracked is measured from the results of correlating each satellite signal with a locally generated pseudo-random function. The relative phase of carrier signals from a number of satellites is a measurement that is used by a receiver to calculate the desired end quantities of distance, velocity, time, etc. Since the P-code functions are to be classified by the United States government so that they can be used for military purposes only, commercial users of the GPS must work only with the C/A code pseudo-random function.

The GPS receiver industry has been plagued with many problems, including for example, (1) in unintentional jamming from other users of the RF spectrum; (2) in acquisition of data from low elevation satellites; and (3) in dual land GPS receivers, splitting the L1 and L2 signals without increasing the chances of being adversely impacted by (1) and (1) above, to name a few.

The accuracy with which positions are determined using GPS depends on two factors; the satellite configuration geometry and the measurement accuracy. The usual term for GPS measurement accuracy is the user equivalent range error (UERE), which represents the combined effect of ephemeris uncertainties, propagation errors, clock and timing errors, and receiver noise.

The effect of satellite configuration geometry is expressed by the dilution of precision (DOP) factor, which is the ratio of the positioning accuracy to the measurement accuracy, or $$\sigma = DOP \cdot \sigma_0,$$

where $\sigma_0$ is the measurement accuracy (standard deviation), and $\sigma$ is the positioning accuracy (e.g., standard deviation in one coordinate). DOP is a scalar representing the contribution of the configuration geometry to the positioning accuracy. There are many varieties of DOP, depending on what particular coordinate, or combinations of coordinates, one is considering the accuracies of. The more common DOPs are:

VDOP$\cdot\sigma_0$ is the standard deviation in height (Vertical)

HDOP$\cdot\sigma_0$ is the accuracy in 2D Horizontal position

PDOP$\cdot\sigma_0$ is the accuracy in 3D Position

TDOP$\cdot\sigma_0$ is the standard deviation in Time

HTDOP$\cdot\sigma_0$ is the accuracy in Horizontal position and Time

GDOP$\cdot\sigma_0$ is the accuracy in 3D position and time (Geometrical).

The term DOP comes from the confidence ellipsoid, a way to quantify the accuracy of position. The standard deviation in one coordinate (i.e. height) is represented by the distance from the center to the surface of the ellipsoid along the local vertical direction (the height axis). According to the above equation, it is also equal to VDOP$\cdot\sigma_0$. For horizontal positioning, in confidence ellipsoid terms, one generally expresses the "size" of the horizontal ellipse: one reasonable measure is square root of the sum of squares of the two axes of the horizontal ellipse. This is HDOP$\cdot\sigma_0$. In general, any DOP is equivalent to the square root of the sum of the squares of the confidence region axes corresponding to the parameters being assessed.

The position accuracy is maximized using GPS, when one satellite is at the user's zenith (overhead satellite) and three others are separated by 120° and are as low on the horizon (low elevation satellite) as permitted by the user's antenna elevation angle (maximize the horizontal cross-sectional area). Conversely, less accuracy in position is obtained when satellites are bunched together.

However, since the signals from low elevation satellites tend to be weaker and noisier than an overhead satellite, the performance or accuracy of a GPS receiver is hindered and the acquisition of reliable data from such satellites is more difficult. Accordingly, it is desirable to maximize the signal from low elevation satellites, while minimizing the noise in a GPS receiver.

It is generally held that the more loss in the front end of a multi-channel GPS receiver, i.e. in the antenna and splitter, the lower the received signal to noise ratio and the lower the position accuracy of such receiver will be. It is therefore desirable to minimize noise and signal loss in the front end of a GPS receiver for improved performance and position accuracy.

Applicant is not aware of any multi-channel GPS patents disclosing prefilters and splitters to reduce the noise figure in the front end of a GPS receiver before entering the radio frequency receiving section, while simultaneously splitting and delivering the signals to each channel with little or no signal loss or reflections. It is also extremely important to minimize the noise figure and signal loss in the radio frequency section of a GPS receiver for accurate position data.

In a multi-channel GPS receiver utilizing a single antenna, the signal from the antenna must be split to at least two channels. Applicant is not aware of any patents relating to two channel GPS receivers that prefilter the signal in the front end before entering the RF receiving section, with minimal unwanted RF reflections and loss therein, before entering such RF receiving section.

It is desirable to filter GPS receivers to address these problems.

2. Description of the Related Art Including Information Disclosed under 37 USC §1.97–99

Many methods and apparatus relating to global positioning system receivers have been disclosed. Typifying these are those listed below.

U.S. Pat. No. 4,928,106 discloses an improved GPS receiver. The receiver is formed in two major sections. The first is a radio frequency section that simultaneously receives the L-band signals from a plurality of satellites and develops low intermediate frequency signals within the capability of readily available digital circuits. The second is a digital processing section which receives the intermediate frequency signals, correlates them with the C/A code of each satellite whose signals are being processed, and provides measurements of the relative phase of each signal. Correlation with (demodulation by) the C/A-code pseudo random function is accomplished in the digital section, not in the radio frequency section of the receiver. The relative phase and other measurements are then used by a processor to calculate the desired end quantities, such as position, distance, velocity, time and the like. All clocks and timing signals used by both the radio frequency and digital processing sections of the receiver are mutually coherent, being derived from a common oscillator.

U.S. Pat. No. 4,445,118 discloses a navigation system, such as the GPS system, wherein the position coordinates of user terminals 14 are obtained by processing multiple signals transmitted by a constellation orbiting signals 16, an acquisition aiding signal generated by an earth-based control station 12 is relayed to user terminals via a geostationary satellite 10 to simplify user equipment. The aiding signal is FSK modulated on a reference channel slightly offset from a standard GPS channel. The aiding signal identifies satellites in view having best geometry and includes Doppler prediction data as well as GPS satellite coordinates and identification data associated with user terminals within an area being served by the control station 12 and relay satellite 10. The aiding signal is supposed to reduce user equipment by simplifying spread spectrum signal demodulation and reducing data processing functions previously carried out at the user terminals 14.

U.S. Pat. No. 4,468,793 discloses a global positioning system comprising an RF receiver for receiving L1, L2, P-code or C/A-code modulated frequency outputs from one or more space vehicles, a multiplexer connected to the receiver multiplexes the L1 and L2 signals to the receiver, and code and carrier tracking loops are connected to the receiver, each loop includes a plurality of filters, one for tracking lanosite dynamics and another for determining ionosphere effects on the L1 and L2 signals. Referring to FIG. 1b, a flip-flop 24 controls the switch 22 to admit alternately the L1 and L2 coded frequency signals to a first stage mixer 30 of the first stage of the two stage down conversion RF module 17.

U.S. Pat. No. 4,622,557 discloses a transdigitizer for relaying signals from global positioning system satellites. First, an RF stage comprising an antenna, filter and preamplifier receiver, filters and amplifies the 1575 MHz signals. Following the RF stage, a converter stage consisting of a bandpass filter, converts the GPS signal to a lower frequency. Then, an intermediate frequency comprising an IF amplifier, multiplier, bandpass link filter and limiter further amplifies and filters the signals to remove the effects of the signals. A final down converter converts the signal to a base band frequency and in a zero crossing detector, the signal is amplified and one bit quantitized. Finally, a local oscillator controls a frequency synthesizer to latch the signal from the zero crossing detector in a flip-flop, which in turn is used to control a quadraphase monitor, whose signals are amplified and transmitted out the transmit antenna.

U.S. Pat. No. 4,457,006 discloses a global positioning system receiver, having a biphase modulated radio frequency input signal applied to the front end of a double heterodyne receiver having a second intermediate frequency stage which operates in the audio frequency range. The audio output signal is phase locked to a one KHz reference signal and is applied to a microprocessor for processing via an interface circuit which includes an amplitude detector and a biphase detector. The microprocessor also controls the phase shifting of a pseudo-random noise code generator whose output is modulated with the output of a first intermediate frequency stage of the receiver.

U.S. Pat. No. 4,426,712 discloses a correlation system for a global positioning receiver, for receiving and interpreting data in the GPS including faster-than-real-time correlators for correlating the code portions of individual signals with matching codes stored in memory, thus creating a plurality of virtual channels for acquiring and tracking each visible satellite.

U.S. Pat. No. 4,359,733 discloses a satellite-base vehicle position determining system for determining the positions of a plurality of vehicles traveling on or above a defined sector of the earth's surface, which includes a transponder carried by each vehicle for transmitting a uniquely coded beacon signal in response to a general interrogation signal, at least three repeater-carrying satellites at spaced orbital locations above the earth for receiving and retransmitting the beacon signals produced by the vehicles, and a ground station for periodically transmitting the general interrogation signal and for receiving and processing the beacon signals retransmitted by the three satellites in order to determine vehicle position. In order to avoid signal overlap and equipment saturation at the ground station, each vehicle transponder includes means responsive to the general interrogation signal for inhibiting the transmission of further beacon signals by the transponder for a predetermined time interval following the response of the transponder to the general interrogation signal.

The following patents are directed to non-analogous radio frequency splitting methods or devices.

U.S. Pat. No. 4,902,991 discloses a radio frequency signal combining/sorting device which includes a plurality of filters, and a diplexer device connected to one side of input/output sides of each of the filters for combining/sorting signals, and includes a coupling device formed at the input/output ends of the filter connected side of the diplexer device, with the filters being formed at their side connected to the diplexer device, with openings for receiving the coupling device. In column 3, lines 47 et. seq. the electrical link of the individual transmission lines 22 from the junction point 24 including the coupling loops 25 is set at ¼ wavelength, for example at an electrical angle $\phi$ shown in FIG. 2 of 90°, on the assumption that the channel filters 10 and 11 are not coupled with the duplexer means 12 at the required center frequency band of the transmitter multiplexer.

U.S. Pat. No. 5,068,629 discloses a nonreciprocal circuit element having a ferrite assembly which has a pair of ferrite members and a plurality of central conductors interposed between the ferrite members, and a dielectric substrate which has a earthing electrode formed on one of its faces and a plurality of impedance matching electrodes formed on the other face, and wherein a direct current magnetic field is applied to the ferrite members. The ferrite assembly and the dielectric substrate are stacked such that lead-out portions of the central conductors are, respectively, connected to the impedance matching electrodes, while earthing portions of the central conductors and the earthing electrode are grounded. In a preferred embodiment, the element is provided between a transmitter and a duplexer of a mobile telephone system.

U.S. Pat. No. 4,916,582 discloses an electronic component such as an inductor, a bandpass filter or a duplexer wherein an electronic component core and shielding electrode layers interpose intermediate layers made of a nonmetal material. The component is made by laminating intermediate layers, shielding electrode layers and protective layers in this order on both main surfaces of a electronic component core in order to form a laminated body, and a step of baking the laminated body.

U.S. Pat. No. 4,546,334 is directed to an electrical filter device in which cut-off spaces required in a casing of the device are reduced more so than in conventional arrangements, and which are free from unnecessary coupling and are constructed entirely by capacitor coupling for compact size.

None of the cited references disclose or suggest a method and apparatus for prefiltering a global positioning system receiver of this invention.

It is a desirable feature of the present invention to provide a global positioning receiver that is reliable, can be made for a low cost, is a low power consumer, and includes a simple receiver structure.

It is another desirable feature of the present invention to provide a receiver system that improves the accuracy of the ultimate quantities desired, such as position, velocity, and time.

SUMMARY OF THE INVENTION

According to the present invention there is provided a method for pre-filtering a global positioning system receiver, comprising the steps of: receiving a plurality of L-band radio frequency signals having unique modulation and originating in a plurality of global positioning system satellites; splitting the plurality of radio frequency signals into at least a first L1 radio frequency signal and a second L2 radio frequency signal; passing the first L1 radio frequency signal to a first radio frequency receiving section through a L1 signal passage defining a path from a common junction point to the L1 radio frequency receiving station, while simultaneously passing the L2 radio frequency signal to a second radio frequency receiving section through a L2 signal passage defining a path from the common junction point to the L2 radio frequency receiving section; filtering the L1 radio frequency signal from the L2 signal passage and filtering the L2 radio frequency signal from the L1 signal passage, while substantially preserving the L1 radio signal and the L2 radio frequency signal; and feeding the L1 and the L2 radio frequency signals to the first L1 radio frequency receiving section and the second L2 radio frequency receiving section, for determining position information.

A method for pre-filtering a global positioning system receiver, comprising the steps of: receiving a plurality of L-band radio frequency signals having unique modulation and originating in a plurality of global positioning system satellites; splitting said plurality of radio frequency signals into at least a first L1 radio frequency signal and a second L2 radio frequency signal; passing the first L1 radio frequency signal to a first radio frequency receiving section through a L1 signal passage defining a path from a common junction point to the L1 radio frequency receiving station, while simultaneously passing the L2 radio frequency signal to a second radio frequency receiving section through a L2 signal passage defining a path from the common junction point to the L2 radio frequency receiving section; isolating the L1 radio frequency signal from the L2 signal passage and isolating the L2 radio frequency signal from the L1 signal passage, while substantially preserving the L1 radio frequency and L2 radio frequency signals; fixing the lengths of said L2 passage such that the impedance at the end of the L2 passage is substantially infinite with respect to the L1 radio frequency signal; fixing the length of the L1 passage such that the impedance at the end of the L1 passage is substantially infinite with respect to the L2 radio frequency signal; matching the lengths of the L1 passage and the L2 passage such that the impedance at the end of the L2 passage is substantially infinite with respect to the L1 radio frequency signal and the impedance at the end of the L1 passage is substantially infinite with respect to the L2 radio frequency signal; simultaneously, substantially minimizing reflection of L1 and L2 radio frequency signals along the L2 and L1 paths, respectively; feeding the L1 and the L2 radio frequency signals to the first L1 radio frequency receiving section and the second L2 radio frequency receiving section; developing intermediate frequency signals in the first L1 radio frequency receiving section and the second L2 radio frequency receiving section; and processing the intermediate frequency signals for determining a relative phase for each signal and end quantities of position, distance, velocity, time or the like.

Further according to the present invention there is provided an apparatus for pre-filtering a global positioning system receiving, comprising: means for receiving a plurality of L-band radio frequency signals having unique modulation and originating in a plurality of global positioning system satellites; means for splitting the plurality of radio frequency signals into at least a first L1 ratio frequency signal and as second L2 radio frequency signals; passing means for passing the first L1 radio frequency signal to a first radio frequency receiving section through a L1 signal passage defining a path from a common junction point to the L1 radio frequency receiving station, and passing the L2 radio frequency signal to a second radio frequency receiving section through a L2 signal passage defining a path from the common junction point to the L2 radio frequency receiving section; means for filtering the L1 radio frequency signal from the L2 signal passage and filtering the L2 radio frequency signal from the L1 signal passage, while substantially preserving the L1 radio frequency and the L2 radio frequency signals.

DESCRIPTION OF A PREFERRED EMBODIMENT

Figure 1:
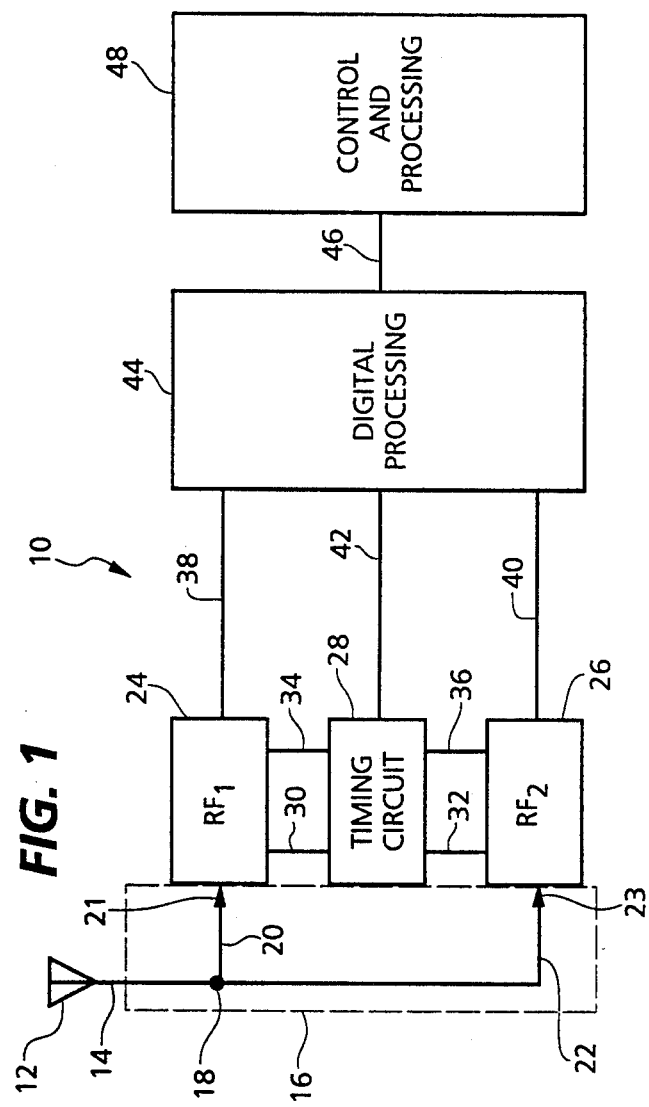
FIG. 1, a simplified block diagram illustrating a satellite receiver embodying the method and apparatus of prefiltering a global positioning system receiver of the present invention.

Illustrated in FIG. 1, is a simplified block diagram of a multi-channel GPS receiver 10 of this invention.

The satellite receiver 10 has provisions for connection to an appropriate antenna 12. A preferred antenna is an omni-directional antenna for a more consistent signal reception. Signals received from the satellites are right circular polarized, so the optimal antenna efficiently reconstructs a signal of that polarization while rejecting the cross-polarization that results from reflected signals.

Briefly, after receiving a right circular polarized signal, the signal travels down transmission line 14 to a prefiltering device 16, which includes a common junction point 18 and first filter passage 20 with end 21 and a second filter passage 22 with end 23. From passages 20 and 22, the signals enter a first L1 and second L2 radio frequency receiving section or channels 24 and 26, where they are eventually processed to determine position information.

The method for pre-filtering a global positioning system receiver of the instant invention, includes the following steps. First, a plurality of L-band radio frequency signals are received through antenna 10, having unique modulation and originating in a plurality of global positioning system satellites. Second, the plurality of radio frequency signals are split by a splitting device or prefiltering device 16 into at least a first L1 radio frequency signal and a second L2 radio frequency signal. It is desirable that there be little or no signal loss in the signals when it is split. Third, the first L1 radio frequency signal is passed or fed to a first radio frequency receiving section 24 through a L1 signal passage 20 defined by a path from a common junction point 18 to the L1 radio frequency receiving section 24, while simultaneously the L2 radio frequency signal is passed or fed to a second radio frequency receiving section 26 through a L2 signal passage 22, defined by a path from the common junction 18 to the L2 radio frequency receiving section 26. Fourth, the L1 radio frequency signal is isolated from the L2 filter passage 22 and the L2 radio frequency signal is isolated from the L1 filter passage 20, while the L1 radio frequency and the L2 radio frequency signals are preserved without loss. Steps 1–4 occur before the L1 and L2 signals are allowed to pass to the electronics or L1 and L2 radio frequency receiving sections 24 and 26. And finally, the L1 and L2 radio frequency signals are fed or passed to the first L1 radio frequency receiving section 24 and the second L2 radio frequency receiving section 26, for eventual determination of position information.

In one embodiment, the method further includes the steps of developing intermediate frequency signals 38 and 40 in the first L1 and second L2 radio frequency receiving sections 24 and 26, and subsequently, processing the intermediate frequency signals in 44 and 48 for determining a relative phase for each signal and end quantities of position, distance, velocity, time or the like.

More particularly, the first channel L1 receiving section 24, reduces the frequency bands of the several L1 signals present, and a second RF receiving section 26 for reducing the frequency bands of the several L2 signals present. An output 38 of the L1 section 24, in this example, is a signal having a frequency of $3.5f_0$ ($f_0 = 1.023$ MHz), with a bandwidth of $2f_0$, the coded data pseudo-random noise that is modulated onto the L1 carrier by each of the satellites being monitored. An output 40 of the L2 radio frequency section 26 is, in this example, a $1f_0$ signal with practically all modulated information removed, so it has a narrow bandwidth. The L1 and L2 receiving sections 24 and 26 receive local oscillator signals from a common timing circuit 28.

Figure 2:
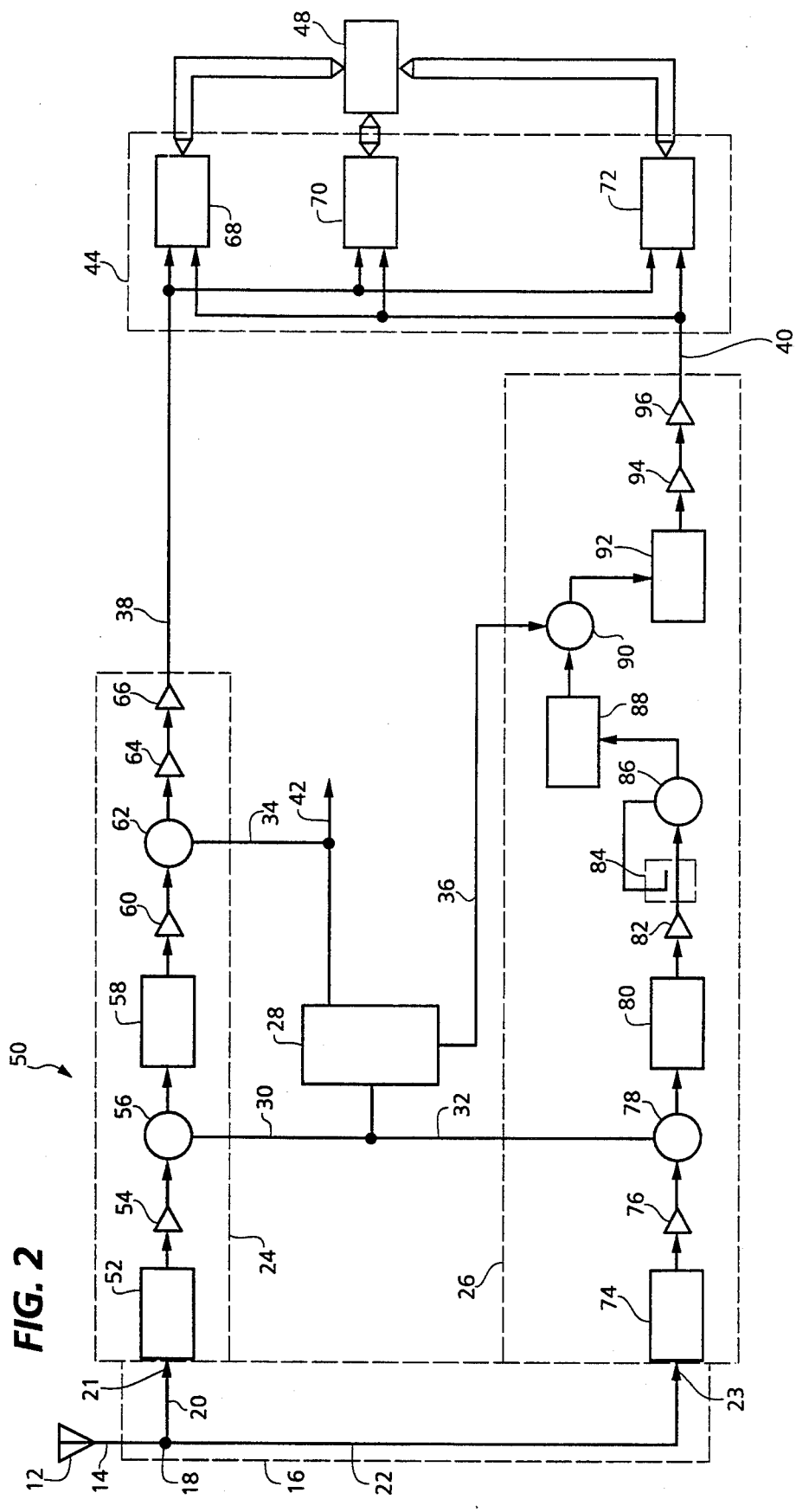
FIG. 2 is the circuit of FIG. 1 in more detail.

Each of the L1 and L2 intermediate frequency signals in lines 38 and 40 are applied to digital processing 44. Referring to FIG. 2, digital processing 44 includes a plurality of individual digital processing channels 68, 70, and 72. It is necessary to simultaneously process signals from several satellites, and depending upon the particular information to be derived, usually needs to monitor signals from four or more satellites. It is preferable that a number of digital processing channels be provided that is equal to the maximum number of satellites whose signals may be simultaneously monitored and processed by the receiver when applied for its intended use. Control and processing section 48 controls the operation of the digital processing channels 68, 70, and 72 received, and the measured phase, frequency and code phase outputs of each channel for calculating the ultimate quantity of distance, velocity, time or the like.

The satellite receiver 10 of FIG. 1, includes at least the L1 and L2 portions 24 and 26. The purpose of using the L2 carrier signal is to provide a reference for eliminating from the L1 carrier signal measured quantities effected by the ionosphere.

In a preferred embodiment, the method for prefiltering a global positioning system receiver, comprises the steps of:

(a) receiving a plurality of L-band radio frequency signals having unique modulation and originating in a plurality of global positioning system satellites through a common antenna 12 and transmission line 14;

(b) splitting said plurality of radio frequency signals into at least a first L1 radio frequency signal and a second L2 radio frequency signal with a prefiltering device 16;

(c) passing said first L1 radio frequency signal to a first radio frequency receiving section 24 through a L1 signal passage 20 defined by a path or passage from the common junction point 18 to said L1 radio frequency receiving station 24, while simultaneously passing said L2 radio frequency signal to a second radio frequency receiving section 26 through a L2 signal passage 22, defined as a passage from said common junction point 18 to said L2 radio frequency receiving section 26;

(d) isolating said L1 radio frequency signal from the L2 signal passage 22 and isolating said L2 radio frequency signal from the L1 signal passage 20, while substantially preserving the L1 radio frequency and L2 radio frequency signals, by:

(1) fixing the lengths of said L2 passage such that the impedance at the end of said L2 passage 22 is substantially infinite with respect to said L1 radio frequency signal;

(2) fixing the length of said L1 passage such that the impedance at the end of said L1 passage 20 is substantially infinite with respect to said L2 radio frequency signal;

(3) matching the lengths of said L1 passage 20 and said L2 passage 22 such that the impedance at the end 23 of said L2 passage 22 is substantially infinite with respect to the L1 radio frequency signal and the impedance at the end 21 of said L1 passage 20 is substantially infinite with respect to the L2 radio frequency signal; and (4) simultaneously, substantially minimizing and inhibiting unwanted reflection of L1 and L2 radio frequency signals along the L2 and L1 passages 22 and 20, respectively;

(e) feeding said L1 and said L2 radio frequency signals to said first L1 radio frequency receiving section 24 and said second L2 radio frequency receiving section 26;

(f) developing intermediate frequency signals in the first L1 radio frequency receiving section 24 and the second L2 radio frequency receiving section 26;

(g) processing said intermediate frequency signals 38 and 40 for determining a relative phase for each signal and end quantities of position, distance, velocity, time or the like.

In a preferred embodiment, the prefiltering method of the instant invention includes accomplishing many things simultaneously in the front end of the GPS receiver 10. For example, the L1 signal is filtered and isolated from adversely effecting the L2 signal passage 22 because there are no unwanted L1 signal reflections leaking or traveling to the L2 passage 22 from the L1 filter passage 20. Similarly, the L2 signal is filtered and isolated from the L1 signal passages 20 because there are no unwanted L2 signal reflections leaking or reflecting back into the L1 filter passage 20 causing unwanted losses. This is accomplished by selecting the proper lengths in filter passages 20 and 22. In effect, the L1 signal only travels along the transmission line of passage 20 while the L2 signal only travels along the transmission line of passage 22. Next, the first L1 and second L2 filter passages 20 and 22, comprise microstrips of short length for minimal loss along such short passages 20 and 22, and provide a compact design.

In a preferred embodiment, the loss along each transmission line, L1 passage 20 and L2 passage 22, is less than 0.5 dB, and preferably less than about 0.1 dB for improved efficiency and accuracy of receiver 10. In addition, the L1 and L2 passages 20 and 22 are specially configured to inhibit and minimize unwanted reflections of the L1 and L2 radio frequency signals along the L2 and L1 paths, respectively. In effect, the L1 and L2 filter passages 20 and 22 essentially only allow their respective L1 and L2 signals to travel therealong, without unwanted reflections to effect each signal. Further, the instant invention impedance tuning or matching is accomplished by: (i) fixing and matching the lengths of the L2 passage 22 such that the impedance at the end 23 of the L2 passage 22 is substantially infinite with respect to the center frequency of the L1 signal so that the L2 signal does not reflect into the L1 passage 20 causing signal loss therein; and (ii) fixing and matching the length of the L1 passage 20 such that the impedance at the end 21 of the L1 passage 20 is substantially infinite with respect to the center frequency of the L2 signal for essentially little to no unwanted reflections of the L1 signal into the L2 passage 22 causing signal loss. The first L1 and second L2 filter passages 20 and 22 are tuned or filtered to accept the L1 and L2 signals only, while rejecting, inhibiting and substantially minimizing unwanted reflection of the L1 and L2 radio frequency signals along the L2 and L1 paths, respectively. All of the above contributing to better accuracy of the GPS receiver 10.

In a preferred embodiment, the instant method of prefiltering a GPS receiver further includes the step of filtering L1 radio frequency receiving section 24 from other radio frequency signals, including but not limited to, the L2 radio frequency signal, and the L2 radio frequency receiving section 24 from other radio frequency signals, including but not limited to, the L1 radio frequency signals, for improved unintentional jam resistance.

The prefiltered global positioning system receiver 10, is configured and designed to have a small loss, for example, it should have a noise figure of less than about 3 dB for good accuracy, and preferably about 2.5 dB or less for optimum efficiency and accuracy, while also having jam immunity. Preferably, the L1 and L2 signal passages 20 and 22 are microstrip transmission lines of about 2 inches in length for passage 20, and about 3 inches in length for passage 22. Microstrips are preferred for economy of space and cost and minimal loss across the passage lengths 20 and 22, improved impedance matching and minimal loss in the front end of GPS receiver 10. The L1 and L2 passages 20 and 22 lengths have been specially developed to substantially minimize unwanted reflection of the L1 and L2 radio frequency signals along the L2 and L1 paths 22 and 20, respectively, for minimal noise figures in the front end and maximum gain.

More particularly, the length of the L1 passage 20 and L2 passage 22 have been impedance matched or transformed such that the impedance at the end of the L1 passage 20 is substantially infinite (open circuit) with respect to the center of the L2 radio frequency signal, and the L2 passage 22 impedance at the end of the L2 passage is substantially infinite (open circuit) with respect to the center of the L1 radio frequency signal, resulting in substantially minimizing loss and substantially eliminating unwanted reflection of L1 and L2 radio frequency signals in the front end of GPS receiver 10, along the L2 passage 22 and L1 passage 20, respectively. More particularly, in a preferred embodiment, the length of each L1 and L2 filter passage 20 and 22 is chosen such that it transforms the impedance of the corresponding filter, at the other channel's center frequency, to an infinite impedance or open circuit.

If the first L1 filter passage 20 impedance at the center frequency of the L2 frequency ($f_2$) is:

$$Z_f = jX_f \qquad (1)$$

which is fully reactive (real part is zero) due to the filter's loss-less properties then, the impedance looking into the transmission line to the first filter at the junction point 18 is at $f_2$ is:

$$\frac{Z_s}{Z_0} = \frac{Z_f + jZ_0\tan(\beta l_1)}{Z_0 + jZ_f\tan(\beta l_1)} \text{ where } \beta = \frac{2\pi f_2}{c}, [2]$$

$l_1$ is the line length of passage 20, $Z_0$ is the transmission line characteristic impedance, c is the propagation speed in the line, $j = \sqrt{-1}$ and $X_f$ is the measured reactance at the center frequency of the other filter or L2 frequency.

Letting $Z_s = \infty$ and plugging [1] into [2]:

$$\tan(\beta l_1) = \frac{Z_0}{X_f} \qquad [3]$$

or $$l_1 = \frac{c}{2\pi f_2} \tan^{-1}\left(\frac{Z_0}{X_f}\right) \qquad [4]$$

Doing the same for the length $l_2$ of passage 22, is $$l_2 = \frac{c}{2\pi f_1} \tan^{-1}\left(\frac{Z_0}{X_f}\right) \qquad [5]$$

where $f_1$ is the L1 frequency. Using equations [4] [5] and above, optimal L1 and L2 filter passages 20 and 22 were derived. The reactance xf for L1, and L2 were measured at $-115\Omega$ and $-92\Omega$, respectively. See Table 1 below.

TABLE 1

| | Freq.(MHz) | $X_f(\Omega)$ | Wavelength(in.) | $Z_o$ | L(inch) |
|---|---|---|---|---|---|
| L1 | 1575 | −115 | 5.412 | 50 | 3.022 |
| L2 | 1226 | -92 | 6.953 | 50 | 2.277 |

Referring to FIG. 2, a GPS receiver 50 is illustrated. The signals from the antenna 12 are simultaneously applied to two channels of a multi-channel radio frequency section, the first L1 radio frequency receiving section 24 for reducing the frequency bands of the several L1 signals present, and the second L2 radio frequency receiving section 26 for reducing the frequency bands of the several L2 signals present. An output 38 of the first L1 section 24 is a signal having a frequency of $3.5f_0$ ($f_0 = 1.023$ MHz), with a bandwidth of $2f_0$, the coded pseudorandom noise that is modulated onto the L1 carrier by each of the satellites being monitored. An output 40 of the second L2 radio frequency section 26 is a $1f_0$ signal with practically all modulated information removed, so it has a narrow bandwidth. Both L1 and L2 sections 24 and 26 receive local oscillator signals from a common timing circuit 28. Each of the L1 and L2 intermediate frequency signals in lines 38 and 40 are applied to each of a plurality of individual digital processing channels 68, 70 and 72. It is necessary to simultaneously process signals from several satellites and commonly to monitor signals from four or more satellites, depending upon the particular information to be derived. It is preferable that a number of digital processing channels be provided that is equal to the maximum number of satellites whose signals may be simultaneously monitored and processed by the receiver 50. Control and processing section 48 controls the operation of the digital processing channels 68, 70 and 72 and receives the measured phase, frequency, and code phase outputs of each channel for calculating the ultimate quantity of distance, velocity or the like depending upon the receiver's intended application.

The L1 section 24 includes two down-converters. A bandpass filter 52 receives the signals from the antenna 12 and is centered to pass the L1 carrier frequency of $1540f_0$. The bandwidth of the filter 52 is made to be greater than the $2f_0$ MHz bandwidth of the C/A-code in the L1 signal, typically a bandwidth of 35 MHz. The filter 52 strongly suppresses the L2 and other signals outside its bandpass, including a band of image frequencies near the L2 band. The filter output is applied to a radio frequency amplifier 54 that is selected to have high gain yet low noise. One made of gallium arsenide components is preferable. The output of that amplifier is applied to a first mixer 56 which also receives a local oscillator frequency of $1372f_0$ in a line 30. The mixer 56 is a commercially available double-balanced mixer. The signal output of the mixer 56 is then applied to another bandpass filter 58. The filter 58 has a center of its bandpass at $168f_0$, the difference between the two frequencies applied to the mixer 56. The sum of those frequencies, which is also included in the output of the mixer 56, is rejected by the filter 58. The bandwidth of the filter 58 is approximately 2.2 MHz, slightly greater than that of the spectrum of the C/A-code. The filter 58 is preferably a surface acoustic wave (SAW) type. The band limited signal output of the filter 58 is then amplified by a monolithic silicon amplifier 60. That amplifier's output is then applied to a second mixer 62 which receives a local oscillator signal having a frequency of $171.5f_0$ from the timing circuit 28 from a line 34. The difference frequency of about $3.5f_0$ output of the mixer 62 is then amplified by a commercially available high gain amplifier 64 operating in a non-linear, saturated region. The amplifier 64 limits the level of the signal to components to which its output is connected, in order to avoid overdriving them. Only the phase of the signal must be preserved by the components in the radio frequency section, so clipping of the signal's amplitude is of no concern. Finally, the output of the amplifier 64 is applied to a comparator 66 which translates that amplifier output to digital logic levels in line 38 for use by the digital processing 44 channels 68, 70, and 72.

The L2 radio frequency section 26 connects the signal from the antenna 12 to a bandpass filter 74 and has a center bandpass frequency of $1200f_0$, the L2 carrier frequency.

An amplifier 76 applies an amplified version of that band limited signal to a first mixer 78. The mixer 78 receives the same local oscillator signal from line 32 that does the first mixer 56. The frequency of that local oscillator, namely $1372f_0$, is chosen to be intermediate of the carrier frequencies of the L1 and L2 signals.

An output of the first mixer 78 is applied to bandwidth filter 80 centered at $172f_0$, which passes the difference frequency output of the mixer 78. The filter signal is then amplified by amplifier 82 which passes the difference frequency output of the mixer 78, that frequency being $172f_0$. The output of the amplifier 82 is applied to an autocorrelator, made up of coupler 84 and a mixer 86. The mixer 86 receives as its radio frequency and local oscillator signals the same L2 signal from the output of the amplifier 82. The result is an output signal, then applied to a bandpass filter 88, that has doubled in frequency, namely to $344f_0$, but which has its spread spectrum collapsed into a narrow bandwidth signal. The autocorrelation results in all of the modulating information in the satellite being eliminated from the signal so that L2 carrier frequency and relative phase can be measured. The modulating information is the P-code pseudo-random function and data that is to be militarily classified, and the autocorrelation simply eliminates the effect of this unknown modulating signal from the signal being examined by the receiver.

An output of the bandpass filter 88 is applied to a second down-converter mixer 90 that also receives a local oscillator signal in a line 36 that is $343f_0$. Therefore, the output of the mixer 90 is a difference signal of $1f_0$. This difference signal is applied to a bandpass filter 92 which has a center frequency of $1f_0$. The filtered signal is amplified by amplifier 94 and converted to a digital signal in a comparator 96 which translates the amplifier output to digital levels for use by the amplifier processing channels 68, 70, and 72.

The receiver 50 is formed in two major sections. The first is a radio frequency section that simultaneously receives the L-band signals from a plurality of satellites and develops low intermediate frequency signals within the capability of readily available digital circuits. The second is a digital processing section which receives the intermediate frequency signals, correlates them with the C/A-code of each satellite whose signals are being processed, and provides measurements of the relative phase of each signal. Correlation with (demodulation by) the C/A-code pseudo random function is accomplished in the digital section, not in the radio frequency section of the receiver. The relative phase and other measurements are then used by a processor to calculate the desired end quantities such as position, distance, velocity, time and the like. All clocks and timing signals used by both the radio frequency and digital processing sections of the receiver are mutually coherent, being derived from a common oscillator. A particular combination of demodulating frequencies has been found that, in addition to providing an intermediate frequency that may be processed digitally, keeps the amount and complexity of circuitry low without creating additional problems. The radio frequency section includes to serially connected frequency down-converter stages for reducing the L1 signal in frequency to something close to twice the bandwidth of the C/A-code pseudo-random function. The resulting low frequency signal is more easily processed by the digital section of the receiver. The radio frequency section optionally includes circuits for reducing the frequency of the L2 signal, including two serial down-converter stages and an autocorrelation (squaring) stage to provide a low frequency signal for the digital processing circuits. The frequency and phase of the intermediate frequency L2 carrier can then be used by the digital section in combination with that of the reduced frequency L1 carrier to determine the effect of the ionosphere on the carrier frequency and phase measurements in order that the unknown effect of the ionosphere on the measurements may be determined. The digital section receives the reduced frequency L1 signals. The L1 signal for each satellite is processed by a separate digital circuit channel. Each channel generates a replica of the L1 carrier signal received from it's satellite. The relative phases of the replica L1 carrier signals for the satellites are measured at a common instant, to the resolution of the highest practical clock frequency. These become base phase measurements. In order to increase the accuracy and resolution of the relative phase measurements, the phase of each replica L1 carrier signal is additionally monitored for a large number of cycles after the base phase measurements. An average incremental phase over these cycles for each channel is then added to its base phase measurement in order to obtain a relative phase of that channel's L1 carrier signal to a higher resolution than is possible by measuring the base phase alone. This then allows the ultimate quantities (position, distance, velocity, time, etc.) that are calculated with the use of the relative L1 signal carrier phases to be obtained with greater accuracy. Each digital channel generates from memory a replica of the C/A-code of its satellite L1 signal, since each such satellite code is known. Its phase is adjusted to match that in the received L1 signal by a phase adjusting circuit. The relative phase of the C/A-code is part of the information that may be used to make the desired end calculations of distance, velocity, time and the like. But the in-phase C/A-code is also used to demodulate the L1 signal in each channel in order to obtain the replica of its L1 signal carrier that is used to make the phase measurements described above. In a preferred form of U.S. Pat. No. 4,928,106, the L1 carrier replica is obtained by locking onto it by a loop that includes a numerically controlled oscillator (NCO). The NCO includes a variable module counter and a circuit that generates periodic shift pulses to keep the counter in-phase with the L1 signal carrier. The module of the counter changes each time it receives a shift pulse. The base relative phase of each L1 carrier signal is determined at the common instant by reading the outputs of the respective digital processing channels' counters. The finer resolution phase measurement discussed above is obtained by counting and averaging the number of shift pulses in the NCO counter that occur during a predetermined period after the instant of base phase measurement. This is a simple, straight forward method of carrying out the high resolution L1 signal carrier phase measurements discussed above.

Although the various aspects of the present invention have been described with respect to a preferred embodiment thereof, it will be understood that the invention is entitled to protection within the full scope of the appended claims.

We claim:

1. A method for prefiltering a global positioning system receiver, comprising the steps of:
   a) receiving a plurality of L-band radio frequency signals having unique modulation and originating in a plurality of global positioning system satellites;
   b) splitting said plurality of radio frequency signals into at least a first L1 radio frequency signal and a second L2 radio frequency signal;

c) passing said first L1 radio frequency signal to a first radio frequency receiving section through a L1 signal passage defining a path from a common junction point to said L1 radio frequency receiving section, while simultaneously passing said L2 radio frequency signal to a second radio frequency receiving section through a L2 signal passage defining a path from said common junction point to said L2 radio frequency receiving section;

d) filtering said L1 radio frequency signal from the L2 signal passage and filtering said L2 radio frequency signal from the L1 signal passage, while substantially preserving the L1 radio frequency and the L2 radio frequency signals and matching the lengths of said L1 passage and said L2 passage such that the impedance at the end of said L2 passage is substantially infinite with respect to a center frequency of the L1 radio frequency signal and the impedance at the end of said L1 passage is substantially infinite with respect to a center frequency of the L2 radio frequency signal; and e) feeding said L1 and said L2 radio frequency signals in step d to said first L1 radio frequency receiving section and said second L2 radio frequency receiving section, for determining position information.

2. The method of claim 1, further comprising the steps of developing intermediate frequency signals in the first L1 radio frequency receiving section and the second L2 radio frequency receiving section; and processing said intermediate frequency signals for determining information.

3. The method of claim 1, wherein the steps (a) to (d) occur before the signals reach the L1 or L2 radio frequency receiving section.

4. The method of claim 1, wherein said fed signal of said L1 radio frequency receiving section includes the step of filtering the first L1 radio frequency receiving section from other radio frequency signals including said L2 radio frequency signals in the L1 radio frequency receiving section, and further includes the step of filtering the second L2 radio frequency receiving section from other radio frequency signals including said L1 radio frequency receiving section.

5. The method of claim 1, wherein said filtered L1 radio frequency signal of said L1 passage includes a loss of less than 0.5 dB, and said filtered L2 radio frequency signal of said L2 passage includes a loss of less than 0.5 dB.

6. The method of claim 1, wherein said global positioning system receiver has a noise figure of less than about 3 dB.

7. The method of claim 1, wherein said filtering step includes fixing the lengths of said L2 passage such that the impedance at the end of said L2 passage is substantially infinite with respect to said L1 radio frequency signal, and said filtering step further includes fixing the length of said L1 passage such that the impedance at the end of said L1 passage is substantially infinite with respect to said L2 radio frequency signal.

8. The method of claim 1, wherein said L1 frequency is about 1575 MHz and said L2 frequency is about 1227 MHz.

9. The method of claim 1, wherein said L1 passage includes a micro-strip comprising a conductive material of about 2 inches in length, and said L2 passage includes a microstrip comprising a conductive material of about 3 inches in length.

10. The method of claim 1, further comprising the step of processing the signals from said first and second radio frequency receiving sections to calculate a relative phase for each signal and end quantities of position, distance, velocity, time or the like.

11. The method of claim 1, wherein said filtering step includes simultaneously, substantially minimizing unwanted reflection of the L1 and L2 radio frequency signals along the L2 and L1 paths, respectively.

12. The method of claim 1, wherein said first length of the L1 passage is defined by $$L_1 = \frac{c}{2\pi f_2} \tan^{-1}\left(\frac{Z^o}{X_f}\right),$$

and said second length of the L2 passage is defined by $$L_2 = \frac{c}{2\pi f_1} \tan^{-1}\left(\frac{Z^o}{X_f}\right),$$

wherein $f_1$ and $f_2$ are the L1 and L2 frequencies, $Z_o$ is the transmission line characteristic impedance, c is the propagation speed and $X_f$ is the reactance at the $f_2$ and $f_1$ frequencies.

13. A method for pre-filtering a global positioning system receiver, comprising the steps of:

(a) receiving a plurality of L-band radio frequency signals having unique modulation and originating in a plurality of global positioning system satellites;

(b) splitting said plurality of radio frequency signals into at least a first L1 radio frequency signal and a second L2 radio frequency signal;

(c) passing said first L1 radio frequency signal to a first radio frequency receiving section through a L1 signal passage defining a path from a common junction point to said L1 radio frequency receiving station, while simultaneously passing said L2 radio frequency signal to a second radio frequency receiving section through a L2 signal passage defining a path from said common junction point to said L2 radio frequency receiving section;

(d) isolating said L1 radio frequency signal from the L2 signal passage and isolating said L2 radio frequency signal from the L1 signal passage, while substantially preserving the L1 radio frequency and L2 radio frequency signals;

(1) fixing the lengths of said L2 passage such that the impedance at the end of said L2 passage is substantially infinite with respect to said L1 radio frequency signal;

(2) fixing the length of said L1 passage such that the impedance at the end of said L2 passage is substantially infinite with respect to said L2 radio frequency signal;

(3) matching the lengths of said L1 passage and said L2 passage such that the impedance at the end of said L2 passage is substantially infinite with respect to the L1 radio frequency signal and the impedance at the end of said L1 passage is substantially infinite with respect to the L2 radio frequency signal; and (4) simultaneously, substantially minimizing unwanted reflection of L1 and L2 radio frequency signals along the L2 and L1 paths, respectively;

(e) feeding said L1 and said L2 radio frequency signals to said first L1 radio frequency receiving section and said second L2 radio frequency receiving section;

(f) developing intermediate frequency signals in the first L1 radio frequency receiving section and the second L2 radio frequency receiving station; and (g) processing said intermediate frequency signals for determining a relative phase for each signal and end quantities of position, distance, velocity, time or the like.

14. The method of claim 13, wherein said global positioning system receiver has a noise figure of about 2.5 dB or less.

15. The method of claim 13, wherein said fed signal of said L1 radio frequency receiving section includes the step of filtering the first L1 radio frequency receiving section from other radio frequency signals including said L2 radio frequency signals and wherein said fed signal of said L2 radio frequency receiving section includes the step of filtering the second L2 radio frequency receiving section from other radio frequency signals including said L1 radio frequency signals.

16. The method of claim 13, wherein said isolated L1 radio frequency signal of said L1 passage includes a loss of less than 0.5 dB and said isolated L2 radio frequency signal of said L2 passage includes a loss of less than 0.5 dB.

17. An apparatus for prefiltering a global positioning system receiver, comprising:

means for receiving a plurality of L-band radio frequency signals having unique modulation and originating in a plurality of global positioning system satellites;

means for splitting said plurality of radio frequency signals into at least a first L1 radio frequency signal and a second L2 radio frequency signal;

passing means for passing said first L1 radio frequency signal to a first radio frequency receiving section through a L1 signal passage defining a path from a common junction point to said L1 radio frequency receiving station, and passing said L2 radio frequency signal to a second radio frequency receiving section through a L2 signal passage defining a path from said common junction point to said L2 radio frequency receiving section;

means for filtering said L1 radio frequency signal from the L2 signal passage and filtering said L2 radio frequency signal from the L1 signal passage, while substantially preserving the L1 radio frequency and the L2 radio frequency signals, said filtering means includes a first length defined as the length of said L2 passage such that the impedance at the end of said L2 passage is substantially infinite with respect to said L1 radio frequency signal, and a second length defined as the length of said L1 passage such that the impedance at the end of said L1 passage is substantially infinite with respect to said L2 radio frequency signal.

18. The apparatus of claim 17, wherein said filtering means includes matching the lengths of said L1 passage and said L2 passage such that the impedance at the end of said L2 passage is substantially infinite with respect to a center frequency of the L1 radio frequency signal and the impedance at the end of said L1 passage is substantially infinite with respect to a center frequency of the L2 radio frequency signal.

19. The apparatus of claim 17, wherein said L1 frequency is about 1575 MHz and said L2 frequency is about 1227 MHz;

said L1 passage includes a micro-strip comprising a conductive material of about 2 inches in length;

said L2 passage includes a micro-strip comprising a conductive material of about 3 inches in length;

said filtered means L1 radio frequency signal of said L1 passage includes a loss of less than about 0.5 dB; and said filtered means L2 radio frequency signal of said L2 passage includes a loss of less than 0.5 dB.

20. The apparatus of claim 17, wherein said first length of the L1 passage is defined by $$L_1 = \frac{c}{2\pi f_2} \tan^{-1}\left(\frac{Z^o}{X_f}\right),$$

and said second length of the L2 passage is defined by $$L_2 = \frac{c}{2\pi f_1} \tan^{-1}\left(\frac{Z^o}{X_f}\right),$$

wherein $f_1$ and $f_2$ are the L1 and L2 frequencies, $Z_o$ is the transmission line characteristic impedance, c is the propagation speed and $X_f$ is the reactance at the $f_2$ and $f_1$ frequencies.

* * * * *